(12) United States Patent
Young et al.

(10) Patent No.: US 8,688,065 B2
(45) Date of Patent: Apr. 1, 2014

(54) METHOD TO MEASURE TOTAL NOISE TEMPERATURE OF A WIRELESS RECEIVER DURING OPERATION

(75) Inventors: Lawrence E. Young, La Canada, CA (US); Dmitry Turbiner, Pasadena, CA (US); Stephan X. Esterhuizen, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/601,581

(22) Filed: Aug. 31, 2012

(65) Prior Publication Data

US 2014/0065994 A1    Mar. 6, 2014

(51) Int. Cl.
*H04B 17/00* (2006.01)
*H04W 24/06* (2009.01)

(52) U.S. Cl.
CPC .............. *H04B 17/004* (2013.01); *H04W 24/06* (2013.01)
USPC ................... 455/226.1; 455/226.3; 455/226.4; 455/296

(58) Field of Classification Search
CPC .................................................. H04W 24/08
USPC ............... 455/296, 310, 226.1, 226.3, 226.4; 324/613, 614
See application file for complete search history.

(56) References Cited

U.S. PATENT DOCUMENTS

| | | | | |
|---|---|---|---|---|
| 2,988,693 | A * | 6/1961 | Billig et al. | 324/614 |
| 3,875,328 | A * | 4/1975 | Gibson et al. | 348/193 |
| 4,004,230 | A * | 1/1977 | Campbell | 455/226.3 |
| 4,742,561 | A * | 5/1988 | Tipton | 455/67.12 |
| 4,905,308 | A * | 2/1990 | Davidson | 455/226.1 |
| 4,998,071 | A * | 3/1991 | Strid et al. | 324/613 |
| 5,046,133 | A * | 9/1991 | Watanabe et al. | 455/138 |
| 5,125,108 | A * | 6/1992 | Talwar | 455/278.1 |
| 5,172,064 | A * | 12/1992 | Walls | 324/601 |
| 5,694,437 | A * | 12/1997 | Yang et al. | 375/346 |
| 5,864,799 | A * | 1/1999 | Corretjer et al. | 704/228 |
| 5,952,968 | A * | 9/1999 | McDowell | 342/383 |
| 6,968,171 | B2 * | 11/2005 | Vanderhelm et al. | 455/296 |
| 7,058,368 | B2 * | 6/2006 | Nicholls et al. | 455/114.2 |
| 7,158,773 | B2 * | 1/2007 | Kurita et al. | 455/307 |
| 7,315,277 | B2 * | 1/2008 | Henderson et al. | 342/357.59 |
| 7,539,273 | B2 * | 5/2009 | Struckman | 375/341 |
| 8,401,509 | B1 * | 3/2013 | Gupta et al. | 455/296 |

* cited by examiner

*Primary Examiner* — Duc M Nguyen
(74) *Attorney, Agent, or Firm* — Milstein Zhang & Wu LLC; Joseph B. Milstein

(57) ABSTRACT

An electromagnetic signal receiver and methods for determining the noise level and signal power in a signal of interest while the receiver is operating. In some embodiments, the signal of interest is a GPS signal. The receiver includes a noise source that provides a noise signal of known power during intervals while the signal of interest is observed. By measuring a signal-to-noise ratio for the signal of interest and the noise power in the signal of interest, the noise level and signal power of the signal of interest can be computed. Various methods of making the measurements and computing the power of the signal of interest are described. Applications of the system and method are described.

13 Claims, 2 Drawing Sheets

US 8,688,065 B2

METHOD TO MEASURE TOTAL NOISE TEMPERATURE OF A WIRELESS RECEIVER DURING OPERATION

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to systems and methods to measure noise in wireless receivers.

BACKGROUND OF THE INVENTION

An elegant noise measurement technique was developed as part of radar research during WW II by Dr. Dicke. This approach alternately measured the net power in a given passband's bandwidth of the system of interest versus a calibrated noise source.

An extension of this approach is described in "A Noise-Adding Radiometer for the Parkes Antenna", T. J. Brunzie, TDA Progress Report 42-92, October-December 1987. This approach allowed continuous monitoring of the passband total power. As with Dr. Dicke's approach, the total power in a bandpass is measured.

The next-generation GPS control system (OCX) requires monitor receivers to measure the GPS signal levels. The receivers measure the signal to noise ratios (SNRs), but the noise level is required in addition in order to deduce the signal levels. The initially proposed means to measure the noise for these monitor stations was a process to measure the SNR of each code, then use the Automatic Gain Control (AGC) level to determine the bandpass power in each of the receiver's baseband spectra. Since the AGC operates after about 100 dB of amplification, variations of gain in the receiver would exceed the error budget for code power measurements. Also, the AGC measures the noise in the total bandpass, while the SNR measures the noise which has been filtered by the receiver's local model of the transmitted ranging code. The latter is what is needed to translate from SNR to signal power. The current invention measures the noise power after it has been filtered by the code model, and is therefore what is needed to translate the measured SNR to the received signal power.

There is a need for systems and methods that provide and take advantage of a more accurate measure of noise temperature experienced by wireless receivers during operation.

SUMMARY OF THE INVENTION

According to one aspect, the invention features an electromagnetic signal receiver. The electromagnetic signal receiver comprises an antenna configured to receive an electromagnetic signal, the antenna having an antenna output terminal configured to provide an antenna signal; a noise source configured to provide a pre-defined noise signal at a noise source output terminal; an attenuator configured to attenuate a signal applied to an attenuator input terminal and to provide as output at an attenuator output terminal an attenuated signal; a switch having at least two switch input terminals and a switch output terminal, the switch configured to accept at the at least two input terminals a respective first signal to be switched and a second signal to be switched, the switch configured to be controlled by a control module, and to successively connect a respective one of the first signal to be switched and the second signal to be switched to the switch output terminal under the control of the control module, the first input signal consisting of the pre-defined noise signal, and the second input signal consisting of an attenuated copy of the pre-defined noise signal applied to the attenuator input terminal and provided at the attenuator output terminal; a directional coupler configured to receive the antenna signal and configured to receive a second signal from an output terminal of the switch, the directional coupler configured to combine the antenna signal and the second signal, the directional coupler having an output terminal configured to provide the combined antenna signal and the second signal as output; an analysis circuit configured to receive from the output terminal of the directional coupler successive analysis circuit input signals, a first analysis circuit input signal consisting of the combined antenna signal and the first signal to be switched and a second analysis circuit input signal consisting of the combined antenna signal and the second signal to be switched provided at the output terminal of the directional coupler, and to provide as output at an analysis circuit output terminal a result based on the successive analysis circuit input signals; and a control module in communication with the analysis circuit and the switch and configured to control the analysis circuit and the switch. The electromagnetic signal receiver is configured to measure a power signal-to-noise ratio ($SNR_P$) of the received electromagnetic signal over a known integration time, is configured to measure a noise power in the received electromagnetic signal contained in a known frequency spectrum, is configured to calculate a signal power of the received electromagnetic signal as a function of the power signal-to-noise ratio and the noise power, and is configured to provide the calculated signal power of the received electromagnetic signal as the result. The receiver is configured to provide the measured noise power as another result.

In one embodiment, the analysis circuit comprises at least one of a filter, a preamplifier and a signal processing circuit.

In another embodiment, the analysis circuit is a GPS receiver.

In yet another embodiment, the analysis circuit is a cellular telephone receiver.

In still another embodiment, the analysis circuit is a portable receiver.

According to another aspect, the invention relates to a method of calculating a signal power of an electromagnetic signal. An electromagnetic signal receiver comprises an antenna configured to receive an electromagnetic signal, the antenna having an antenna output terminal configured to provide an antenna signal; a noise source configured to provide a pre-defined noise signal at a noise source output terminal; an attenuator configured to attenuate a signal applied to an attenuator input terminal and to provide as output at an attenuator output terminal an attenuated signal; a switch having at least two switch input terminals and a switch output terminal, the switch configured to accept at the at least two input terminals a respective first signal to be switched and a second signal to be switched, the switch configured to be controlled by a control module, and to successively connect a respective one of the first signal to be switched and the second signal to be switched to the switch output terminal under the control of the control module, the first input signal consisting of the pre-defined noise signal, and the second input signal consisting of an attenuated copy of the pre-defined noise signal applied to the attenuator input terminal and provided at the attenuator output terminal; a directional coupler configured to receive the antenna signal from the antenna output terminal and configured to receive a second signal from an output terminal of the switch, the directional coupler configured to combine the antenna signal and the second signal, the directional coupler having an output terminal configured to provide the combined antenna signal and the second signal as output; an analysis circuit configured to receive from the output terminal of the directional coupler successive analysis circuit input signals, a first analysis circuit input signal consisting of the combined antenna signal and the first signal to be switched and a second analysis circuit input signal consisting of the combined antenna signal and the second signal to be switched provided at the output terminal of the directional coupler, and to provide as output at an analysis circuit output terminal a result based on the successive analysis circuit input signals; and a control module in communication with the analysis circuit and the switch and configured to control the analysis circuit and the switch; such that the electromagnetic signal receiver is configured to measure a power signal-to-noise ratio ($SNR_p$) of the received electromagnetic signal, is configured to measure a noise power in the received electromagnetic signal, is configured to calculate a signal power of the received electromagnetic signal as the product of the power signal-to-noise ratio and the noise power, and is configured to provide the calculated signal power of the received electromagnetic signal as one result and the effective system noise as another result. The method comprises the steps of: providing an electromagnetic signal receiver; receiving an electromagnetic signal; operating the noise source to generate a noise signal; combining the antenna signal and the noise signal; analyzing the antenna signal and the noise signal to obtain a signal-to-noise ratio for the antenna signal after receiver processing and a noise power for the combined antenna-receiver; computing a result comprising a power level in the antenna signal using the signal-to-noise ratio and the noise power; and performing at least one of recording the result, transmitting the result to a data handling system, or to displaying the result to a user.

In one embodiment, the electromagnetic signal is a GPS signal.

In another embodiment, the steps of operating the noise source, combining the antenna signal and the noise signal and analyzing the antenna signal and the noise signal to obtain a signal-to-noise ratio for the antenna signal and a noise power for the antenna signal are repeated iteratively.

In yet another embodiment, the step of operating the noise source comprises generating a noise signal that varies in duration for different repetitions.

In still another embodiment, the step of operating the noise source comprises generating a noise signal that varies in power for different repetitions.

In a further embodiment, the step of computing a result and the step of performing at least one of recording the result, transmitting the result to a data handling system, or displaying the result to a user are repeated.

In an additional embodiment, a signal at a constant level is generated and injected through the directional coupler so that the system noise can be measured in the absence of any received electromagnetic signals.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The current invention is uses measurements of the Signal to Noise Ratio (SNR), and changes in the SNR when calibrated noise levels are added, to continuously monitor a particularly useful portion of the noise while signals are actually being received and used.

Measurement of Total Noise Power Spectral Density

We describe a method to measure the total noise power in a GPS receiver, including contributions from the system temperature, the antenna temperature, interference, lossy components, and other noise sources. In order to monitor the health of GPS satellites, it is advantageous to be able to measure signal levels for each satellite that one observes. In order to determine the signal level, one needs the noise power in order to extract the signal power from the signal-to-noise ratio (SNR). In operation, when a GPS receiver receives a signal of interest, it is advantageous to be able to determine the power level of the signal. This can be accomplished if one can measure a signal-to-noise ratio, and then measure the corresponding noise power. "Corresponding noise power" means the noise power that is selected by the receiver circuitry, including the code despreading, and which affects the SNR. One can then determine the signal power level from the signal-to-noise ratio and the noise power level by multiplying the corresponding noise power by the signal-to-noise ratio. While the description will use a GPS receiver as an illustration, it is contemplated that the method could be applied to receivers of other kinds.

GPS receivers are subject to receiving not only a signal of interest, which can include a noise component, but also are subject to receiving other signals that add to the receiver's effective noise background. Examples of such other signals that can include noise or which may represent a pure noise signal (e.g., that do not include any signal that the receiver is intended to receive and process) include ambient electromagnetic radiation which can range from 4 K background radiation in deep space to 300 K background radiation in a typical terrestrial location as well as intermediate temperatures such as 150 K ambient in orbit around a planet such as Earth, radio frequency signals in various spectral bands emitted by other kinds of systems (such as radio signals, TV signals and cellular telephone signals including those emitted by cell phone towers). In some instances, the broadcast frequency of signals that represent pure noise may be within the acceptance bandwidth of the GPS receiver, and can represent a significant unwanted noise signal.

As a general description of the systems and methods used, we inject a known level of noise before the preamplifier periodically during normal tracking, which can be done with a very low duty cycle, so that there is insignificant SNR loss for the GPS signals being tracked. In some embodiments, one can optionally use higher duty cycles for better precision.

Figure 1:
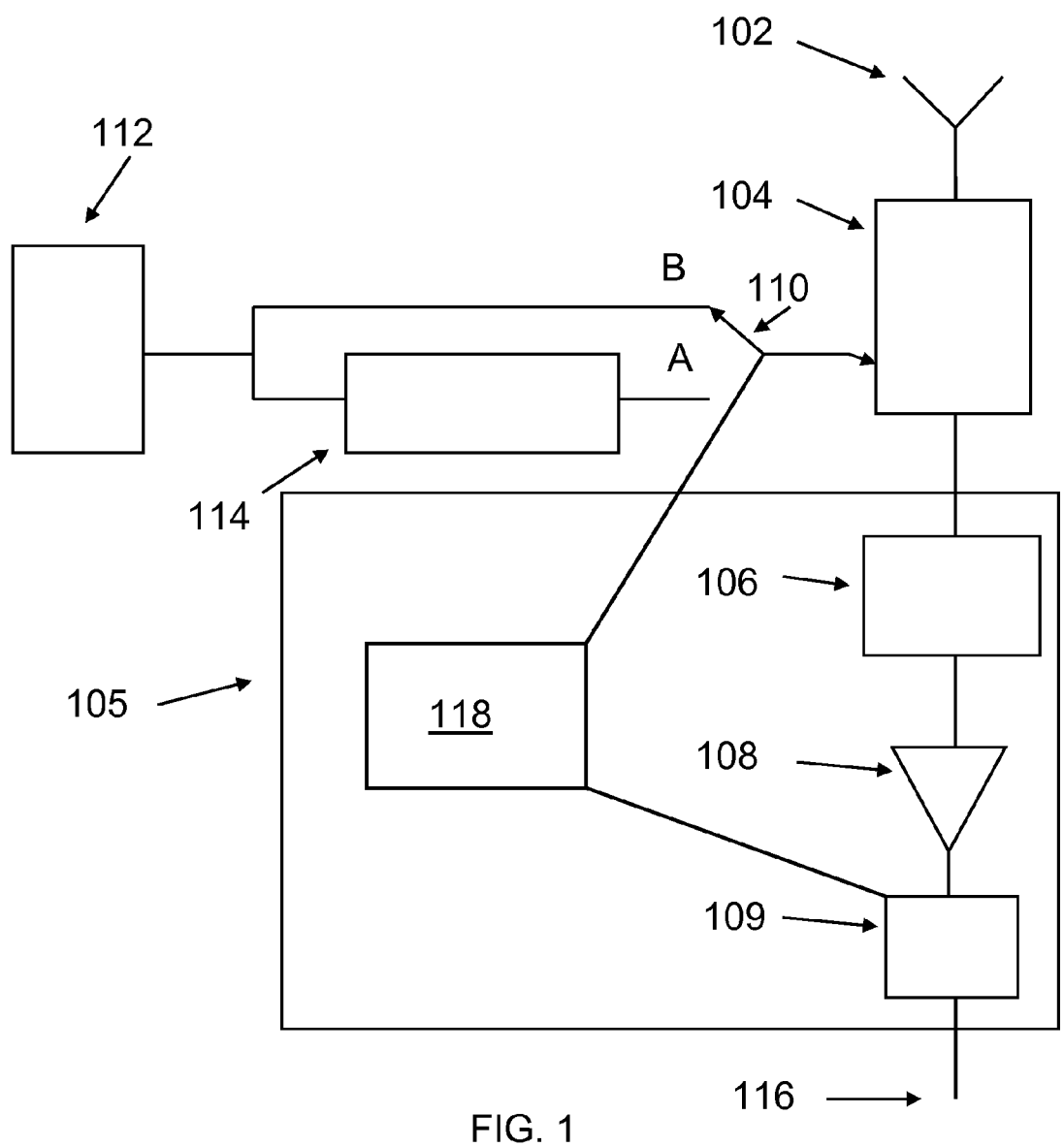
FIG. 1 is a schematic diagram that illustrates an exemplary embodiment of a receiver modified to provide a noise temperature measurement according to principles of the invention.

Turning to FIG. 1, there is shown a schematic diagram that illustrates an exemplary embodiment of a receiver modified to provide a noise temperature measurement according to principles of the invention. Antenna 102 is used to receive a signal of interest and to communicate that signal (including its noise components) to a directional coupler 104, such as a −20 dB directional coupler.

According to principles of the invention, a switch 110 is provided to communicate one or more deliberately added noise signals to the directional coupler 104. While the switch 110 is shown with two positions (A and B) in general the switch can have two or more positions or switch terminals that are configured to receive input signals. In the embodiment illustrated in FIG. 1, switch 110 is configured to connect a noise source 112 that provides a noise signal having a predefined noise temperature, such as a 10000 K noise diode, to the directional coupler 104, either directly using switch position B, or by way of an attenuator 114 that provides a predefined attenuation of the noise signal, such as a −20 dB attenuator using switch position A. In one embodiment, the attenuation is a 100% attenuation (e.g., open circuit) when using switch position A. The switch 110 can include a control module that allows switch 110 to be switched from one of its positions to another of its positions under control of the control module, which in some embodiments can be a microprocessor-based control module.

The directional coupler 104 combines the signal of interest and the noise signal (when the noise signal is present) to produce a combined signal, and provides the combined signal to an analysis circuit 105 in the receiver. The analysis circuit 105 can include a filter 106, a preamplifier 108, signal processing circuitry 109. A control module 118 is provided to control the analysis circuit 105 and to control the switch 110. In one embodiment, the combined signal is passed to a bandpass filter 106 for filtering. The filtered signal is then passed to a preamplifier 108, and then to a signal processing circuit 109 comprising additional conventional electronics that process the signal to extract information encoded on the signal, such as a signal processor based on a general purpose programmable computer. The control module 118 can also control the signal processing circuit 109. The analysis circuit can compute as a result a value for the power in the signal of interest as explained hereinbelow, and can record such result, display such result to a user, and/or provide such result to another apparatus such as a data handling system that can use such value for other purposes. The result can be provided at analysis circuit output terminal 116. The analysis circuit 105 and the control module 118 can each be implemented using components such as 106 and 108 along with a general purpose programmable computer that operates under the control of instructions recorded on a machine readable medium. In some embodiments, the analysis circuit 105 and the control module 118 are implemented using separate general purpose programmable computers. In some embodiments, the analysis circuit 105 and the control module 118 are implemented using the same general purpose programmable computer.

Alternative embodiments can have the switch positions A and B configured to provide a known noise signal of predefined noise temperature at one of the switch positions and no deliberately added noise signal at another switch position. In some embodiments, the switch can have multiple positions A, B, C, . . . N that provide between 1 and N discrete noise temperature signals each having a known noise temperature, where N is an integer greater than 1.

In one embodiment, a directional coupler is inserted into the signal path of a GPS receiver before the preamplifier. The coupling port is fed with a switch which can be controlled from the receiver's digital processing section. The switch can connect the coupling port to a noise source at a known power level, or to a source with a much lower level.

Some of the advantages of the system and method include the following. All noise sources affecting the received signal are measured. Nearly continuous noise calibrations are made. The effect on the performance of the GPS receiver while in calibration can be less than 0.01 dB of SNR loss. Minimal additional components are required to be added to the receiver. The GPS receiver is used to measure the SNRs required to solve for the noise level. Since this measurement is referenced to the preamplifier input, it is insensitive to variations in the receiver gain.

For purposes of description, we assume the received GPS power in a given code is S, and the receiver has a system temperature, $T_{sys}$, and a RFI equivalent temperature, $T_{RFI}$. The radiometer includes an external noise source that provides a noise with the equivalent temperature of $T_R$. Using the attached notional block diagram, depending on the switch position, the receiver will measure a 1 second power SNR of $$SNR_P(\text{position 1}) = S/[k(T_{sys} + T_{RFI} + T_R/10{,}000)] \quad (\text{eq 1})$$

$$SNR_P(\text{position 2}) = S/[k(T_{sys} + T_{RFI} + T_R/100)] \quad (\text{eq 2})$$

One can divide eq 1 by eq 2 to get $$\frac{SNR_P(\text{position 1})}{SNR_P(\text{position 2})} = \frac{S/[k(T_{sys} + T_{RFI} + T_R/10{,}000)]}{S/[k(T_{sys} + T_{RFI} + T_R/100)]} \quad (\text{eq 3})$$

To simplify, one can ignore the term $T_R/10{,}000$, and cancel the k and S terms to obtain $$\frac{SNR_P(\text{position 1})}{SNR_P(\text{position 2})} = \frac{T_{sys} + T_{RFI} + T_R/100}{T_{sys} + T_{RFI}} \quad (\text{eq 4})$$

Rearranging, $$\frac{SNR_P(\text{position 1})}{SNR_P(\text{position 2})} = 1 + \frac{T_R/100}{T_{sys} + T_{RFI}} \quad (\text{eq 5})$$

Solving for $T_{sys} + T_{RFI}$ gives $$T_{sys} + T_{RFI} = \frac{T_R/100}{[SNR_P(\text{position 1})/SNR_P(\text{position 2}) - 1]} \quad (\text{eq 6})$$

This is the equation which was used to investigate the effects of errors in each of the measurements, and in the power from the noise source, as presented in Table I. One can also take the derivatives with respect to each term to see the sensitivity of the measurement to errors in each of the terms.

In Table I, the columns (from the left to the right) represent the following information: actual $T_{sys}$ is the assumed receiver temperature including any RFI; added noise is the equivalent temperature of the added noise; signal power is the power in the received signal; noise on is the dwell time of the deliberately added noise; noise off is the duration that the deliberate noise is off (or disconnected); SNRp is the signal-to-noise ratio in terms of power (with no added noise); SNRp noise ON is the signal-to-noise ratio in terms of power with added noise; and Calc'd $T_{sys}$ is the calculated system temperature. The last two columns give the calculated error in $T_{sys}$ in terms of percent and dB.

The rows of Table I represent example calculations as follows. The first row is a calculation with the assumption that there are no systemic or random errors present. As seen, the result is zero error. The signal-to-noise ratios calculated are in the ratio 4:3, which is appropriate because the assumed receiver temperature is 300K without added noise, and the noise temperature with added 100K of noise is 400 K, (or 3:4).

The second set of data represents a calculation in which the 100K added noise is assumed to run 1% low (99 K) or 1% high (101 K). In such instances, one estimates this contribution to the calculated system temperature will be approximately 1%.

The third set of data represents the one-sigma low and high calculated values for SNRp, with the given values of Tsys and signal power, and an integration time of 300*0.999 seconds. In such instances, one estimates this contribution to the calculated system temperature will be approximately 0.12%.

The fourth set of data represents the one-sigma low and high calculated values for SNRp noise ON, with the given values of Tsys, added noise, and signal power, and a noise-on integration time of 300*0.001 seconds. In such instances, one estimates this contribution to the calculated system temperature will be approximately 4%.

Optimized Estimation of the Noise Power of a GPS Receiver

In the present approach, we measure the noise power of a GPS receiver by observing the SNR of a constant-power signal with and without the injection of additional noise power into the receiver. That is, $$\sum_0 = \frac{S}{P_N} \tag{7a}$$

and $$\sum_+ = \frac{S}{P_N + P_C}, \tag{7b}$$

where $\Sigma_0$ is the power SNR with only receiver noise present,
$\Sigma_+$ is the power SNR with both receiver noise and coupled-in noise present,
S is the constant GPS signal power,
$P_N$ is the receiver noise power, and
$P_C$ is the additional coupled-in noise power.
Eliminating S from Eqs. 7a and 7b, we solve for $P_N$ and get $$P_N = \frac{P_C}{\frac{\Sigma_0}{\Sigma_+} - 1}, \tag{8}$$

letting us solve for the receiver noise power in terms of three parameters: the coupled-in noise power and the two measured SNRs. From this formula we can compute an estimate of the uncertainty of the estimate of $P_N$ in terms of the uncertainties of the three parameters. We can then use the formula for the uncertainty to optimize the selection of the parameters.

Calculation of the Uncertainty of $P_N$ and its Parameters

Assuming that the second-order partials aren't too big, and that the errors in $P_N$, $\Sigma_0$, and $\Sigma_+$ are uncorrelated (probably untrue for $\Sigma_0$ and $\Sigma_+$, whose measurement errors likely have a positive correlation—but we'll ignore that), a good approximation to the variance of $P_N$ is $$\sigma^2(P_N) = \left(\frac{\partial P_N}{\partial P_C}\right)^2 \sigma^2(P_C) + \left(\frac{\partial P_N}{\partial \Sigma_0}\right)^2 \sigma^2(\Sigma_0) + \left(\frac{\partial P_N}{\partial \Sigma_+}\right)^2 \sigma^2(\Sigma_+). \tag{9}$$

Now we need to define the $\Sigma$s more precisely. For Eq. 8 to make sense, the $\Sigma$s have to refer to the same time interval. We also have to distinguish between the power SNRs in the equations above and the voltage SNRs reported by many receivers. In order to keep these distinctions straight, we adopt the notation $\Sigma_{P,t}$ to indicate a power SNR for an interval t, and similarly $\Sigma_{V,t}$ for a voltage SNR. Furthermore the P or V may be followed by either 0 or + to indicate an SNR measured with only system noise present, or system noise and additional injected noise, respectively.

It is then true that $$\Sigma_{P,t} = \Sigma_{V,t}^2 \tag{10}$$

with the understanding that is $\Sigma_{V,t}$ is the value reported by the GPS receiver divided by $\sqrt{2}$, since the GPS considers both in-phase and quadrature power. Also, as a function of time, $$\Sigma_{V,t} \propto \sqrt{t} \tag{11a}$$

and $$\Sigma_{P,t} \propto t. \tag{11b}$$

The uncertainty of a voltage SNR measured over any interval is 1. Actually this relation is strictly true only in the high-SNR limit, but that is where one operates for the purpose of this calibration. It seems reasonable, because voltage SNR is measured in units of noise amplitude.

The measurement scheme, then, is that one performs a measurement for a time interval T, during which the external noise is added during a fraction f of the time. It is immaterial to the calculation whether the noise is injected during a single interval of length fT or during several shorter intervals, but practical considerations will certainly influence that choice.

With the conventions and rules given above, one can write Eq. 8 more precisely as $$P_N = \frac{P_C}{\frac{\Sigma_{P0,1}}{\Sigma_{P+,1}} - 1}, \tag{12}$$

where without loss of generality 1 second is selected as the time interval for SNR measurements.

We now evaluate the right hand side of Eq. 9. We have $\sigma(P_C)=0.0525\ P_C$. However, to maintain flexibility, we can use a coefficient $\alpha$. This error needs to account for both error in the intrinsic power of the noise generator and error in the coupling coefficient. The other terms are a little more complicated. Consider $\sigma(\Sigma_{P0,1})$. We measure the voltage SNR during an interval $(1-f)T$ with uncertainty $$\sigma(\Sigma_{V0,(1-f)T}) = 1. \tag{13}$$

Then the voltage SNR for a 1-second interval is $$\Sigma_{V0,1} = \frac{\Sigma_{V0,(1-f)T}}{\sqrt{(1-f)T}} \tag{14}$$

with uncertainty $$\sigma(\Sigma_{V0,1}) = \frac{\sigma(\Sigma_{V0,(1-f)T})}{\sqrt{(1-f)T}} = \frac{1}{\sqrt{(1-f)T}}. \quad (15)$$

Now $$\Sigma_{P0,1} = \Sigma_{V0,1}^2 \quad (16)$$

so that $$\delta(\Sigma_{P0,1}) = 2\Sigma_{V0,1}\delta(\Sigma_{V0,1}) \quad (17)$$

(where the operator δ indicates a differential change), and one can therefore write $$\sigma(\Sigma_{P0,1}) = 2\Sigma_{V0,1}\sigma(\Sigma_{V0,1}) = \frac{2\Sigma_{V0,1}}{\sqrt{(1-f)T}}. \quad (18)$$

By the same reasoning, $$\sigma(\Sigma_{P+,1}) = \frac{2\Sigma_{V+,1}}{\sqrt{fT}}. \quad (19)$$

The partial derivatives are straightforward:

$$\frac{\partial P_N}{\partial P_C} = Q, \quad (20)$$

where $$Q = \frac{1}{\frac{\Sigma_{P0,1}}{\Sigma_{P+,1}} - 1} = \frac{\Sigma_{P+,1}}{\Sigma_{P0,1} - \Sigma_{P+,1}}; \quad (21)$$

$$\frac{\partial P_N}{\partial \Sigma_{P0,1}} = \frac{-P_C Q^2}{\Sigma_{P+,1}}, \quad (22)$$

and $$\frac{\partial P_N}{\partial \Sigma_{P+,1}} = \frac{P_C \Sigma_{P0,1} Q^2}{\Sigma_{P+,1}^2}. \quad (23)$$

Substituting, Eq. 9 becomes $$\sigma^2(P_N) = (\alpha P_C Q)^2 + \left(\frac{-P_C Q^2}{\Sigma_{P+,1}}\right)^2 \frac{4\Sigma_{V0,1}^2}{(1-f)T} + \left(\frac{P_C \Sigma_{P0,1} Q^2}{\Sigma_{P+,1}^2}\right)^2 \frac{4\Sigma_{V+,1}^2}{fT}. \quad (24)$$

It is clear in Eq. 24 that minimizing $\sigma(P_N)$ is going to involving optimizing the parameters $\alpha$, f, and $Q$. However, we have to express Eq. 24 in terms of $\alpha$, f, $Q$, and constant parameters, not variables like $P_C$, $\Sigma_{V+,1}$, and $\Sigma_{P+,1}$ that depend on $Q$. We therefore substitute from Eqs. 12 and 21

$$P_C = P_N / Q, \quad (25a)$$

from Eq. 10

$$\Sigma_{V+,1}^2 = \Sigma_{P+,1}, \quad (25b)$$

again from Eq. 10

$$\Sigma_{V0,1}^2 = \Sigma_{P0,1}, \quad (25c)$$

and from Eq. 21

$$\Sigma_{P+,1} = \frac{Q}{Q+1}\Sigma_{P0,1}, \quad (25d)$$

and obtain $$\sigma^2(P_N) = P_N^2 \left[ \alpha^2 + \frac{4(Q+1)^2}{T\Sigma_{P0,1}} \left( \frac{1}{1-f} + \frac{Q+1}{fQ} \right) \right]. \quad (26)$$

This is the form needed. One can see what needs to be done to minimize the variance of the estimate of receiver noise power, $P_N$. Reducing $P_N$ itself would help, but reducing it wouldn't help the relative error anyway. We cannot control $P_N$. The parameter α is isolated, so it is logical to want to make that as small as possible. This can be accomplished by using a well calibrated noise source and understanding how it is coupled into the receiver.

Parameters $Q$ and f are more interesting, since they interact. The function we want to minimize (after stripping away the constants) is $$Z(Q, f) = (Q+1)^2 \left( \frac{1}{1-f} + \frac{Q+1}{fQ} \right). \quad (27)$$

We proceed in the usual way, solving the simultaneous equations $$\frac{\partial Z}{\partial Q} = 0, \text{ leading to } f = \frac{(Q+1)(2Q-1)}{Q-1}, \text{ and} \quad (28a)$$

$$\frac{\partial Z}{\partial f} = 0, \text{ leading to } Q = \frac{(1-f)^2}{2f-1}. \quad (28b)$$

Substituting Eq. 28b into Eq. 28a provides the equation $$(f-1)(3f-2)=0. \quad (29)$$

The solution f=1 is not what we want, so try f=2/3. Then Eq. 28b gives $Q$ =1/3, and Z=16. Performing variations around this point in Z-space confirms that the stationary point is indeed a minimum.

To summarize, the variance of the estimated receiver noise power is minimized, for this scheme, when the additional noise power is three times the receiver noise power (Eq. 25a), and it is injected 2/3 of the time.

We now investigate the relative sizes of the terms in Eq. 26. Recall that in the expression in brackets, the $\alpha^2$ term arises from the uncertainty in the power transferred from the external noise source, the 1/(1−f) term originates in the error in measuring the receiver SNR with only its own noise present, and the $(Q+1)/(fQ)$ term comes from the error in measuring the receiver SNR with the external noise added. We can make either of the measurement-noise terms dominate by letting f→1 (running the noise source all the time), or by letting $Q$ →0 (adding too much external noise) or f→0 (never turning the external noise on). We can consider what happens when operating at the optimum point f=⅔, $Q$ =⅓, Z=16. Then the ratio of the 1/(1−f) term to the ($Q$ +1)/(f$Q$ ) term is ½, and the ratio of the $\alpha^2$ term to the combination of the measurement-error terms is $\alpha^2 T \Sigma_{P0,1}/64$. If we adopt $\alpha$=0.0525, as suggested above, then the ratio becomes 4.31× $10^{-5} T\Sigma_{P0,1}$. The numerical coefficient is small, but with T=1 second and $\Sigma_{P0,1}$=900/$\sqrt{2}$ (typical strong signal), the ratio is $(4.32\times 10^{-5})\times(1)\times 900^2/2$=17.4, so the noise-source-calibration term dominates. Furthermore, it is a fixed error that can't be reduced by averaging multiple measurements, as the SNR measurements can. If we want to improve this calibration scheme, we should apply our effort to that error source.

The results above describe how to choose parameters such as the noise source power and dwell to determine the noise level with the best accuracy. In many applications, one also needs to limit the loss of SNR for the signal of interest, and so we can set the noise power and duty cycle of the noise-on time to lower values.

Additional calculations have been performed using the above theoretical considerations to analyze the receiver noise, as presented in Table II.

Figure 2:
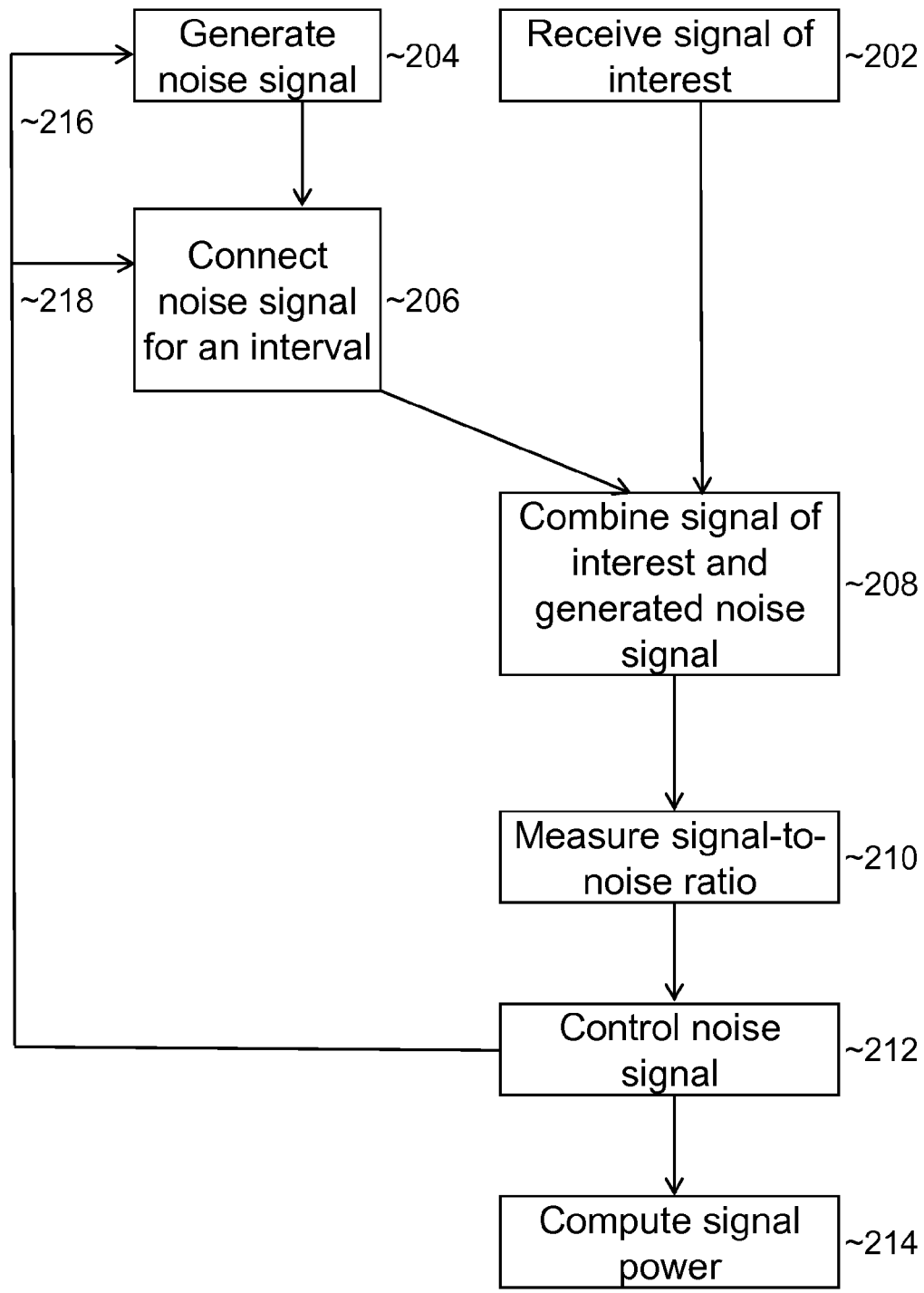
FIG. 2 is a flow diagram that illustrates the steps in an exemplary embodiment of a method for determining a noise temperature experienced by a receiver according to principles of the invention.

FIG. 2 is a flow diagram that illustrates the steps in an exemplary embodiment of a method for determining a noise temperature experienced by a receiver. In applying the method, a signal of interest is analyzed to determine a power level in the signal. At step 202, the signal of interest is received at the antenna of the GPS receiver. The received signal is communicated to the GPS receiver on a continuous basis, where it is measured as indicated in step 208. At step 204, a noise signal of known noise temperature and power level is generated, for example by a noise source such as 112 of FIG. 1. The noise signal is connected to the GPS receiver during a controlled time interval (controlled with regard to duration and timing) at step 206, for example using a controlled switch, such as the switch 110 of FIG. 1. The noise signal is combined with the signal of interest in the GPS receiver as indicated at step 208. The GPS receiver measures a signal-to-noise ratio, as indicated at step 210. During the time that the GPS receiver receives only the signal of interest, the signal-to-noise ratio corresponds to the signal of interest with any noise component that it may contain. During the time that the GPS receiver receives both the signal of interest and the generated noise signal, the signal-to-noise ratio corresponds to the signal of interest with any noise component that it may contain plus the deliberately added noise. The state of the noise-adding switch is communicated directly from step 212 to step 210. By analyzing the time behavior of the signal-to-noise ratio and comparing the observed values with the known addition of a known noise signal, it is possible to deduce the total system noise power including interference noise power, and therefore to calculate the power of the signal of interest, as indicated at step 214. In step 212, the timing and power of the injected noise signal are controlled.

The method can optionally include additional iterative steps, either prior to computing a signal power value at step 214, or in addition to such computation, so that a series of signal power values can be determined as a function of time. By determining repeated signal power values, one can improve the accuracy of such a measurement, or one can observe whether the signal power is varying with time. The optional steps are indicated by arrow 216, which indicates that after step 212, a new noise signal is generated at step 204, and the procedure embodied in steps 202 through 212 is repeated. In other embodiments, the arrow 218 indicating that after step 212 a noise signal is again connected to the GPS receiver at step 206, and steps 202, 208 through 212 are performed. The optional steps can involve using a noise signal of the same or of a different power level (for example by passing a fixed generated noise signal through an attenuator such as attenuator 114, or by using a different noise source that generates a different known noise power level). In some embodiments, the optional steps can involve connecting the known noise source (or a number of known noise sources in a known sequence) for varying time intervals, where the different time intervals are known intervals that are controlled with regard to duration and timing. The iterative steps 216 and 218 can be performed any desired number of times and in any desired order.

When applied to a receiver which calculates the Signal to Noise Ratio (SNR), the methods described hereinabove measure the total receiver system noise plus the receiver's processing loss. In some embodiments, the method is intended to be used continuously during normal receiver function. The measurements are sensitive to signal strength, system noise, Radio Frequency Interference (RFI) strength, and processing loss.

Applications

Various applications that rely on the determination of the noise component of received signals are contemplated. Several applications will now be described. In one application, the method and result are used to recover from outages. In another application, the method and result are used to debug a mobile receiver. In other applications, the method and result are used to advise a user of wireless hardware how it may be possible to improve reception.

I. Advanced Global Navigation Satellite Systems (GNSS)

In one application, one can monitor the received signal power for each code produced by a Global Navigation Satellite System (GNSS), such as GPS. This application is required for the next generation of GPS ground control receivers. The solution initially proposed was a design which would measure the SNR of each code, then use the Automatic Gain Control (AGC) level to determine the bandpass power in the receiver's baseband signal. Since the AGC operates after about 100 dB of amplification, variations of gain in the receiver would exceed the error budget for code power measurements. Also, the AGC measures the noise in the total bandpass, while the SNR measures the noise which has been filtered by the receiver's local model of the transmitted ranging code. The latter is what is needed to translate from SNR to signal power.

The approach described here allows measurements of the receiver total system noise with the required accuracy, and the following features. The measurements can be made continuously with negligible loss of SNR, due to the very low duty cycle required for the noise-on periods. The measured variations in SNR are sensitive to noise that matches the spectral content of noise important for our measurements, that is, noise filtered by the receiver's local model of the incoming ranging codes. This approach has been adopted for the USAF control stations used to monitor the GS satellite signals and to generate solutions for the satellites' orbits and clocks.

II. Dealing with GNSS Tracking Problems

It is believed that one can use the ability to distinguish between signal power including losses, and system noise including RFI to help debug and fix tracking problems within GNSS receivers.

In one example, the current science receivers on the COSMIC 6-satellite constellation suffer a systematic tracking problem on a particular receiver input. The systems and methods for determining the characteristics of an impinging noise signal is expected to allow one to determine if the fault is a signal problem related to the antenna, or is caused by RFI coupling in from a nearby instrument. Because receivers on a satellite cannot easily be repaired, it is useful to be able to determine the cause of an apparent malfunction, so that corrective actions can be applied, or to determine that no corrective actions are possible should that turn out to be the situation.

In other embodiments, these same considerations apply to receivers used on the ground, and can be used to determine causes and possible corrections for apparent malfunctions in such receivers.

III. Applications Using Crowd Sampling

It is expected that the use the measurements to monitor RFI received at multiple receivers can provide information about a source of RFI. With a technique called "crowd sampling" it is expected that intentional or accidental episodes of GNSS signal jamming could be located and the jamming source's amplitude is expected to be estimated. Let some fraction of the people carry a smartphone with a noise-calibrated GPS receiver and a very low data-rate connection through which each phone's location and system temperature can be relayed to a central location. Software running autonomously at this location could monitor system temperature anomalies vs locations from a large number of GPS receivers and solve for the most likely amplitude and location for jamming sources.

The Department of Homeland Security is currently trying to find a way to accomplish the continuous monitoring of GPS jammers. As an example, in 2009 there were multiple interruptions of GPS service at the Newark airport, finally traced to a trucker driving nearby with a GPS jammer, commonly sold to prevent employer tracking of vehicles. In that event, it took workers from the FAA two months to find the source. (reference The Economist, "No jam tomorrow," Technology Quarterly: Q1 2011, Mar. 10, 2011) The capability described above would allow realtime location of such jamming sources. This capability would also be of great use to the DoD in combat zones, where there is the potential for many small jammers that could defeat the current detection approaches.

Applications at Communication Frequencies

It is expected that each of the three techniques (I., II., and III. above) can be applied in communication systems that operate at standard communication frequencies. It is expected that each of the three techniques (I., II., and III. above) can be applied in communication systems that operate at cell phone frequencies. It is expected that each of the three techniques (I., II., and III. above) can be applied in communication systems that operate at Industrial-Scientific-Medical (ISM) frequencies (900 MHz, 2.4 GHz, 5 GHz) defined by the International Telecommunication Union Radiocommunication Sector (ITU-R) in 5.138, 5.150, and 5.280 of the Radio Regulations. Cordless phones, Bluetooth devices, NFC devices, and wireless computer networks all use the ISM bands. The improvements that are contemplated relate to both improving the quality of the communication signal by optimizing the operation of a receiver, as well as improving localization methods that are becoming common in mobile devices such as personal GPS receivers and smartphones that include GPS (or GPS-like) localization capability.

Other Applications

It is expected that variations of the method can be applied using one or more signals deliberately added instead of "white noise," including applying the method using pseudo-random noise or "chirp" signals that cover a range of frequencies. This allows the ambient spectral noise density to be monitored without the presence of a signal in each frequency band that is monitored. Possible applications include the use of the method for automated searches done by routers or other equipment with a choice of frequencies to select the preferred low-noise communication channels autonomously and continuously. That is, after one channel is selected the equipment would continue to look for better channels, and as improved communication is identified, the channel can be exploited.

It is also expected that one can use such deliberately added signals to accomplish crowd sampling-type applications in the absence of a signal source, for GNSS and for other applications.

DEFINITIONS

Unless otherwise explicitly recited herein, any reference to an electronic signal or an electromagnetic signal (or their equivalents) is to be understood as referring to a non-volatile electronic signal or a non-volatile electromagnetic signal. A non-volatile signal is a signal that is amenable to being measured, recorded, or otherwise employed.

The term "noise" as used here refers to power in a spectrum of interest that is in addition to the desired signal power, and which tends to obscure the signal. In communication systems, such as cell phones, the noise level is a factor that limits the rate of reliable data exchange. For radiometric systems, such as GPS receivers, noise limits the accuracy with which time and position can be determined As used herein the term "electromagnetic signal" is used to denote a signal that is being transmitted from an external device to the electromagnetic signal receiver, while the term "antenna signal" refers to the signal exiting an antenna in response to a received "electromagnetic signal."

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/ SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/ write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use by a data handling system. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable gate array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

TABLE I

| actual Tsys | added noise | Signal power | noise on | noise off | SNRp | SNRp noise ON | Calc'd Tsys | error in calc Tsys | |
|---|---|---|---|---|---|---|---|---|---|
| (K) | (K) | dBm | (s) | (s) | (1 sec) | (1 sec) | (K) | (%) | (dB) |
| Baseline prediction | | | | | | | | | |
| 300 | 100 | −130 | 0.001 | 0.999 | 24147.87 | 18110.90 | 300.00 | 0.00 | 0.00 |
| error in added noise | | | | | | | | | |
| 300 | 99 | −130 | 0.001 | 0.999 | 24147.87 | 18156.29 | 303.03 | 1.01 | 0.04 |
| 300 | 101 | −130 | 0.001 | 0.999 | 24147.87 | 18065.73 | 297.03 | −0.99 | −0.04 |
| error in measured SNRp | | | | | | | | | |
| 300 | 100 | −130 | 0.001 | 0.999 | 24140.62 | 18110.90 | 300.36 | 0.12 | 0.01 |
| 300 | 100 | −130 | 0.001 | 0.999 | 24155.11 | 18110.90 | 299.64 | −0.12 | −0.01 |

TABLE I-continued

| actual Tsys (K) | added noise (K) | Signal power (dBm) | noise on (s) | noise off (s) | SNRp (1 sec) | SNRp noise ON (1 sec) | Calc'd Tsys (K) | error in calc Tsys (%) | error in calc Tsys (dB) |
|---|---|---|---|---|---|---|---|---|---|
| | | | | error in measured SNRp with noise | | | | | |
| 300 | 100 | −130 | 0.001 | 0.999 | 24147.87 | 17929.79 | 288.35 | −3.88 | −0.17 |
| 300 | 100 | −130 | 0.001 | 0.999 | 24147.87 | 18292.01 | 312.37 | 4.12 | 0.18 |

TABLE II

Case 1

| $\alpha$ | 0.047129 | $\alpha^2$ | 0.002221100 | $\alpha$ ($\delta$B) | 0.200000 |
| T (s) | 300.0 | Z | 16.0000 | | |
| $\Sigma_{P0,1}$ | 405000.00 | $4Z/T\Sigma_{P0,1}$ | 0.00000053 | | |
| f | 0.66666667 | $\alpha^2/(4Z/T\Sigma_{P0,1})$ | 4216.6196098 | | |
| $Q = P_N/P_C$ | 0.33333333 | $\sigma(P_N)/P_N$ | 0.04713414 | | |
| | | $\sigma(P_N)$ (dB) | 0.2000 | | |

Case 2

| $\alpha$ | 0.047129 | $\alpha^2$ | 0.002221100 | $\alpha$ ($\delta$B) | 0.200000 |
| T (s) | 300.0 | Z | 8004.0040 | | |
| $\Sigma_{P0,1}$ | 405000.00 | $4Z/T\Sigma_{P0,1}$ | 0.00026351 | | |
| f | 0.00100000 | $\alpha^2/(4Z/T\Sigma_{P0,1})$ | 8.4290205 | | |
| $Q = P_N/P_C$ | 1.00000000 | $\sigma(P_N)/P_N$ | 0.04984583 | | |
| | | $\sigma(P_N)/P_N$ (dB) | 0.2113 | | |

What is claimed is:

1. An electromagnetic signal receiver, comprising:
an antenna configured to receive an electromagnetic signal, said antenna having an antenna output terminal configured to provide an antenna signal;
a noise source configured to provide a pre-defined noise signal at a noise source output terminal;
an attenuator configured to attenuate a signal applied to an attenuator input terminal and to provide as output at an attenuator output terminal an attenuated signal;
a switch having at least two switch input terminals and a switch output terminal, said switch configured to accept at said at least two input terminals a respective first signal to be switched and a second signal to be switched, said switch configured to be controlled by a control module, and to successively connect a respective one of said first signal to be switched and said second signal to be switched to said switch output terminal under the control of said control module, said first input signal consisting of said pre-defined noise signal, and said second input signal consisting of an attenuated copy of said pre-defined noise signal applied to said attenuator input terminal and provided at said attenuator output terminal;
a directional coupler configured to receive said antenna signal from said antenna output terminal and configured to receive said first signal or said second signal from the output terminal of said switch, said directional coupler configured to combine said antenna signal and said first signal or said second signal, said directional coupler having a directional coupler output terminal configured to provide as output said combined antenna signal and said first signal or said second signal;
an analysis circuit configured to receive from said output terminal of said directional coupler successive analysis circuit input signals, a first analysis circuit input signal consisting of said combined antenna signal and said first signal to be switched and a second analysis circuit input signal consisting of said combined antenna signal and said second signal to be switched provided at said output terminal of said directional coupler, and to provide as output at an analysis circuit output terminal a result based on said successive analysis circuit input signals; and
a control module in communication with said analysis circuit and said switch and configured to control said analysis circuit and said switch;
such that said electromagnetic signal receiver is configured to measure a power signal-to-noise ratio ($SNR_P$) of said received electromagnetic signal, is configured to measure a noise power in said received electromagnetic signal, is configured to calculate a signal power of said received electromagnetic signal as the product of said power signal-to-noise ratio and said noise power, and is configured to provide said calculated signal power of said received electromagnetic signal as said result.

2. The electromagnetic signal receiver of claim 1, wherein the antenna signal is replaced by an internally generated signal of constant power.

3. The electromagnetic signal receiver of claim 1, wherein said analysis circuit comprises at least one of a filter, a preamplifier and a signal processing circuit.

4. The electromagnetic signal receiver of claim 1, wherein said receiver is a GPS receiver.

5. The electromagnetic signal receiver of claim 1, wherein said receiver is a cellular telephone receiver.

6. The electromagnetic signal receiver of claim 1, wherein said receiver is a portable receiver.

7. A method of calculating a signal power of an electromagnetic signal, comprising the steps of:
providing an electromagnetic signal receiver, comprising:
an antenna configured to receive an electromagnetic signal, said antenna having an antenna output terminal configured to provide an antenna signal;
a noise source configured to provide a pre-defined noise signal at a noise source output terminal;

an attenuator configured to attenuate a signal applied to an attenuator input terminal and to provide as output at an attenuator output terminal an attenuated signal;

a switch having at least two switch input terminals and a switch output terminal, said switch configured to accept at said at least two input terminals a respective first signal to be switched and a second signal to be switched, said switch configured to be controlled by a control module, and to successively connect a respective one of said first signal to be switched and said second signal to be switched to said switch output terminal under the control of said control module, said first input signal consisting of said pre-defined noise signal, and said second input signal consisting of an attenuated copy of said pre-defined noise signal applied to said attenuator input terminal and provided at said attenuator output terminal;

a directional coupler configured to receive said antenna signal from said antenna output terminal and configured to receive said first signal or said second signal from the output terminal of said switch, said directional coupler configured to combine said antenna signal and said first signal or said second signal, said directional coupler having a directional coupler output terminal configured to provide as output said combined antenna signal and said first signal or said second signal;

an analysis circuit configured to receive from said output terminal of said directional coupler successive analysis circuit input signals, a first analysis circuit input signal consisting of said combined antenna signal and said first signal to be switched and a second analysis circuit input signal consisting of said combined antenna signal and said second signal to be switched provided at said output terminal of said directional coupler, and to provide as output at an analysis circuit output terminal a result based on said successive analysis circuit input signals; and a control module in communication with said analysis circuit and said switch and configured to control said analysis circuit and said switch;

such that said electromagnetic signal receiver is configured to measure a power signal-to-noise ratio ($SNR_P$) of said received electromagnetic signal, is configured to measure a noise power in said received electromagnetic signal, is configured to calculate a signal power of said received electromagnetic signal as the product of said power signal-to-noise ratio and said noise power, and is configured to provide said calculated signal power of said received electromagnetic signal as said result;

receiving a electromagnetic signal;

operating said noise source to generate a noise signal;

combining said antenna signal and said noise signal;

analyzing said antenna signal and said noise signal to obtain a signal-to-noise ratio for said antenna signal and a noise power for said antenna signal;

computing a result comprising a power level in said antenna signal using said signal-to-noise ratio and said noise power for said antenna signal; and performing at least one of recording said result, transmitting said result to a data handling system, or to displaying said result to a user.

8. The electromagnetic signal receiver of claim 7, wherein the antenna signal is replaced by an internally generated signal of constant power.

9. The method of calculating a signal power of an electromagnetic signal of claim 7, wherein said electromagnetic signal is a GPS signal.

10. The method of calculating a signal power of an electromagnetic signal of claim 7, wherein said steps of operating said noise source, combining said antenna signal and said noise signal and analyzing said antenna signal and said noise signal to obtain a signal-to-noise ratio for said electromagnetic signal and a noise power for said electromagnetic signal are repeated iteratively.

11. The method of calculating a signal power of an electromagnetic signal of claim 10, wherein said step of operating said noise source comprises generating a noise signal that varies in duration for different repetitions.

12. The method of calculating a signal power of an electromagnetic signal of claim 10, wherein said step of operating said noise source comprises generating a noise signal that varies in power for different repetitions.

13. The method of calculating a signal power of an electromagnetic signal of claim 10, wherein said step of computing a result and said step of performing at least one of recording said result, transmitting said result to a data handling system, or displaying said result to a user are repeated.

\* \* \* \* \*